United States Patent
Hauler

(10) Patent No.: US 9,393,967 B2
(45) Date of Patent: Jul. 19, 2016

(54) METHOD AND DEVICE FOR OPERATING A MOTOR VEHICLE IN AN AUTOMATED DRIVING OPERATION

(71) Applicant: Robert Bosch GmbH, Stuttgart (DE)

(72) Inventor: Florian Hauler, Luisenstr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/427,573

(22) PCT Filed: Aug. 21, 2013

(86) PCT No.: PCT/EP2013/067366
§ 371 (c)(1),
(2) Date: Mar. 11, 2015

(87) PCT Pub. No.: WO2014/044480
PCT Pub. Date: Mar. 27, 2014

(65) Prior Publication Data
US 2015/0246678 A1    Sep. 3, 2015

(30) Foreign Application Priority Data

Sep. 21, 2012 (DE) .......................... 10 2012 217 002

(51) Int. Cl.
*G05D 1/02* (2006.01)
*B60W 50/035* (2012.01)
*B62D 15/02* (2006.01)
(Continued)

(52) U.S. Cl.
CPC .............. *B60W 50/035* (2013.01); *B62D 1/28* (2013.01); *B62D 15/0285* (2013.01); *B60W 2600/00* (2013.01)

(58) Field of Classification Search
CPC ............. G05D 1/02; G08G 1/16; B62D 1/28; B60W 30/08
USPC ........................................ 701/25, 26, 96, 301
See application file for complete search history.

(56) References Cited

U.S. PATENT DOCUMENTS

| | | | |
|---|---|---|---|
| 5,906,645 A | 5/1999 | Kagawa et al. | |
| 8,364,390 B2* | 1/2013 | Harada | G08G 1/096725 340/435 |
| 8,571,786 B2* | 10/2013 | Iwasaki | B60W 10/06 340/435 |

(Continued)

FOREIGN PATENT DOCUMENTS

DE    10 2009 020 649    11/2010

OTHER PUBLICATIONS

International Search Report for PCT/EP2013/067336, dated Sep. 25, 2014.

*Primary Examiner* — Tan Q Nguyen
(74) *Attorney, Agent, or Firm* — Norton Rose Fulbright US LLP

(57) ABSTRACT

A method for operating a motor vehicle in an automated driving operation includes: ascertaining a standard trajectory, the ascertained standard trajectory being transmitted during driving operation with the aid of a control system to an actuator device of the motor vehicle; guiding the motor vehicle along the standard trajectory; ascertaining a safety zone for the motor vehicle, the ascertained safety zone being transmitted with the aid of the control system to the actuator device during the driving operation; and in a case in which error-free automated driving operation for the motor vehicle is no longer ensured, the motor vehicle is guided with the aid of the actuator device into the safety zone.

14 Claims, 2 Drawing Sheets

(51) Int. Cl.
 *B62D 1/28* (2006.01)
 *G08G 1/16* (2006.01)

(56) References Cited

U.S. PATENT DOCUMENTS

2008/0303696 A1 12/2008 Aso et al.
2010/0049375 A1* 2/2010 Tanimoto ............... B60T 7/12 701/1
2010/0121576 A1* 5/2010 Aso ..................... G01S 13/726 701/301
2010/0228427 A1* 9/2010 Anderson ............. B60W 30/09 701/31.4
2012/0083959 A1 4/2012 Dolgov et al.

* cited by examiner

METHOD AND DEVICE FOR OPERATING A MOTOR VEHICLE IN AN AUTOMATED DRIVING OPERATION

BACKGROUND OF THE INVENTION

1. Field of the Invention

The present invention relates to a method and a device for operating a motor vehicle in an automated driving operation.

2. Description of the Related Art

Driver assistance systems which are recently no longer limited to separate longitudinal and lateral guidances only are known in the related art. Additional functions, for example, a congestion assistance or even a highly automated/autonomous driving operation unitize a longitudinal and lateral control to a trajectory control of the motor vehicle.

In order to implement the highly automated/autonomous driving, failures and degradations of control units, sensor systems and actuating elements must always be anticipated. Conventional measures for preventing complete system failures are redundant calculations, redundant data transmissions, (partially) redundant sensor systems and (partially) redundant actuating elements, for example. The mentioned measures are all intended to achieve safe shut-offs and are so-called "fail-safe" methods which are to transfer the vehicle into a safe state. In an autonomous driving operation the driver is completely removed from an influence loop on the vehicle for a certain time period, so that he/she may not contribute to a safe transfer of the motor vehicle into a safe state.

A method and a device for a vehicle for avoiding collisions by evading an obstacle are known from published German patent application document DE 10 2009 020 649 A1. Here, multiple possible evasion trajectories are ascertained in the case of an imminent collision, and time interval limits, which represent the time interval to the obstacle during which an obstacle avoidance maneuver according to the respective trajectory must be initiated at the latest in order to avoid a collision, are assigned to the evasion trajectories.

BRIEF SUMMARY OF THE INVENTION

The object of the present invention is to provide an improved method for operating a motor vehicle in an automated driving operation.

The object is achieved according to a first aspect using a method for operating a motor vehicle in an automated driving operation, including the steps:

ascertaining a standard trajectory, the ascertained standard trajectory being transmitted to an actuator device of the motor vehicle with the aid of a control system during the driving operation;

guiding the motor vehicle along the standard trajectory; and ascertaining a safety zone for the motor vehicle, the ascertained safety zone being transmitted with the aid of the control system to the actuator device during the driving operation; in a case in which the automated driving operation for the motor vehicle is no longer ensured, a switchover to the safety zone is carried out, the motor vehicle thereby being guided with the aid of the actuator device into the safety zone.

According to a second aspect, the object is achieved using a device for operating a motor vehicle in an automated driving operation, including:

a sensor device;
an actuator device;
an ascertaining device;
a control system; and
an error monitoring device;

a standard trajectory and a safety zone being ascertainable with the aid of the ascertaining device, the safety zone being transmittable to the actuator device of the motor vehicle with the aid of the control system, in a case in which it is established with the aid of the sensor device and the error monitoring device that the automated driving operation is no longer ensured, the actuator device of the motor vehicle being switched to the safety zone, the motor vehicle thereby being guidable with the aid of the actuator device into the safety zone.

Preferably, instead of a motor vehicle, a vehicle in general may be provided.

One preferred specific embodiment of the method according to the present invention provides that the safety zone and the standard trajectory are ascertained essentially simultaneously. Advantageously, highly up-to-date data may always be transmitted to the actuator device in this way so that the motor vehicle may be guided into a secure safety zone in the error case.

One preferred embodiment of the method provides that a scenario for an error case is ascertained with the aid of an error monitoring device, the motor vehicle being guided into the safety zone when the error case occurs. This has the advantage that, in the error case, lane data for the motor vehicle have already been transmitted to the actuating elements so that the vehicle may now be guided safely according to the data transmitted in advance.

One other preferred specific embodiment of the method provides for a switchover to the safety zone with the aid of a control system or the error monitoring device depending on the error case. The actuating elements may in this way be advantageously triggered or activated twice, which supports a handling of different error cases. In the case that, for example, a control system for converting trajectory data into actuator data fails, the actuating elements may still be activated alternatively with the aid of the error monitoring device.

One preferred specific embodiment of the method according to the present invention provides that a safety trajectory is ascertained alternatively or in addition to the safety zone, the safety trajectory being transmitted to the actuator device. This has the advantage that a more accurate configuration of a safety zone is provided in this way, so that the motor vehicle may, if necessary, be guided even more accurately into the safety zone and within the safety zone in the error case.

One preferred specific embodiment of the method according to the present invention provides that the motor vehicle is guided along the safety trajectory or into the safety zone in the case that the motor vehicle is only controllable in a limited way with the aid of the actuator device. This provides a sensible possibility for the case in which a device for ascertaining the lane data is essentially completely faultless so that the vehicle may now be guided even more accurately into the safety zone with the aid of a trajectory guide.

One advantageous refinement of the method provides that multiple safety trajectories and multiple safety zones are generated during the automatic driving operation, one of the safety trajectories or one of the safety zones being selected by the error monitoring device after analyzing the error case. In this way, the trajectory or the safety zone which corresponds best to the respective error pattern may be selected in an advantageous way in order to guide the vehicle safely.

One preferred specific embodiment of the method according to the present invention provides that the motor vehicle is guided into the safety zone in the case of an error in a sensor device for a surroundings detection. In this specific error case without sensible orientation or localization possibilities, the motor vehicle is particularly dependent on a guidance into a safe zone.

One preferred specific embodiment of the device according to the present invention provides that the ascertaining device includes a planning module for the standard trajectory, a safety trajectory also being ascertainable with the aid of the planning module, the safety trajectory also being transmittable to the actuator device. In this way, a safety trajectory is advantageously provided with the aid of the planning module as a more accurate configuration of the safety zone.

One advantageous refinement of the device according to the present invention is characterized by the fact that the standard trajectory, the safety zone and the safety trajectory are ascertainable essentially simultaneously with the aid of the planning module. In this way, highly up-to-date driving data for the normal operation and for the error case may always be ascertained, which are consistently adapted to one another. In the error case it is thus highly probable that a secure safety zone or a safe safety trajectory is available.

One preferred specific embodiment of the device according to the present invention provides that the switchover from the standard trajectory to the safety zone may be carried out by a control system or by an error monitoring device. This advantageously provides two different possibilities for the switchover in the error case so that a redundancy for the switchover to the safe data is provided.

Using the method according to the present invention, a safety level for the motor vehicle may be advantageously increased in the automated driving operation in such a way that during the automated driving operation a safety zone or a safely accessible zone is ascertained and communicated to the actuating elements. In the error case in which the automated driving operation is no longer safely ensured, a switchover to the safety zone is carried out, whereby the vehicle is subsequently guided into the safe zone with the aid of the actuating elements.

The present invention is described in greater detail below having additional features and advantages, based on multiple figures. The figures are primarily intended to illustrate the principles that are essential to the present invention.

DETAILED DESCRIPTION OF THE INVENTION

Figure 1:
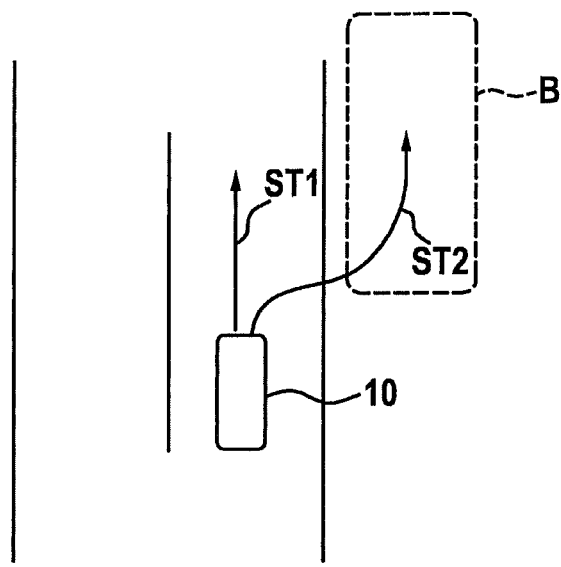
FIG. 1 shows a schematic representation of an automated driving operation of a motor vehicle according to the present invention in a regular mode and in an error case.

FIG. 1 shows, in a schematic representation, a motor vehicle 10 which is in an automated or autonomous driving operation. This driving operation is characterized in that a driver is relieved of all control interventions in the vehicle so that motor vehicle 10 is guided completely automatically along a standard trajectory ST1 for a defined time period.

One trajectory represents a sequence of spatio-temporal points, i.e., a space curve as a function of time. In mathematical form, a trajectory may be described as follows:

$$T : r = \begin{pmatrix} x1 \\ y1, \ldots, \\ \varepsilon 1 \\ t1 \end{pmatrix}$$

where x1, y1 define a point in the two-dimensional space, $\varepsilon 1$ a slope of the trajectory at this point for smoothing the trajectory, and t1 represents a point in time of a validity of the point. Furthermore, a velocity may also be specified for each point. The same applies to three-dimensional trajectories. For temporally equidistant point sequences, an explicit transmission of the point in time may be omitted.

In an error case in which the proper automated driving operation of motor vehicle 10 is no longer ensured, the motor vehicle is guided into a safety zone B according to the present invention. Alternatively, motor vehicle 10 may also be guided along a safety trajectory ST2. With the aid of the present invention it is thus possible in an advantageous way to guide a motor vehicle 10 in the case of severe system errors into a freely drivable zone (safety zone), for example, onto an emergency lane of a roadway and to then stop motor vehicle 10.

Figure 2:
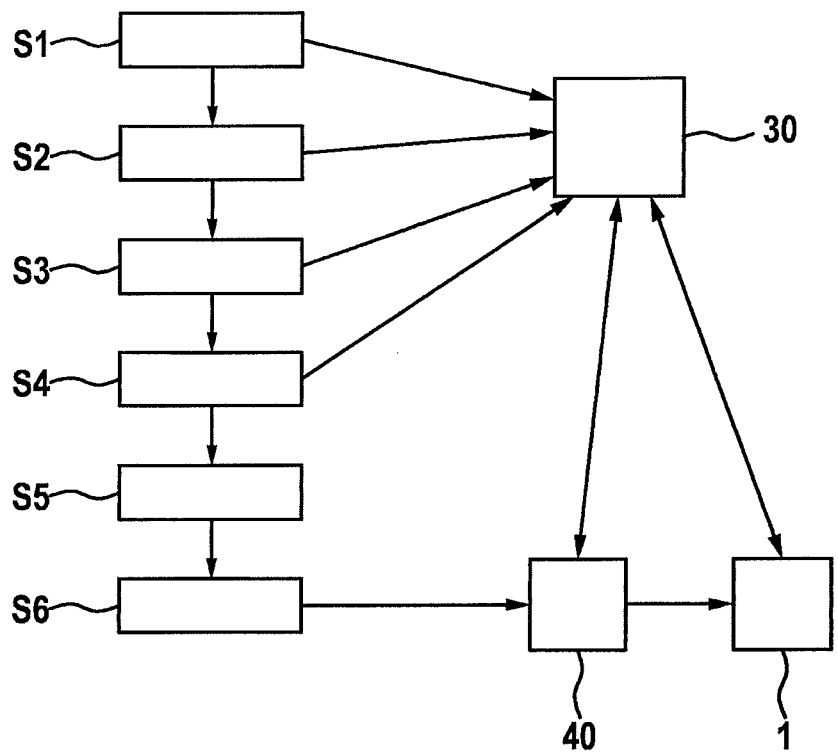
FIG. 2 shows a schematic system representation of one specific embodiment of the method according to the present invention.

FIG. 2 shows in principle a systemic overview of the method according to the present invention which shows a generation of a safety zone B and a transmission thereof to actuating elements of motor vehicle 10 on detection of a system failure in the automated driving operation of motor vehicle 10.

In a step S1 surroundings parameters of motor vehicle 10 are essentially permanently (for example, cyclically after brief time intervals) detected with the aid of different types of sensors (not shown). These parameters may be used in a further step S2 for a surroundings detection and a localization of motor vehicle 10.

In a step S3, a situation analysis is subsequently carried out, including a determination of the present circumstances of the surroundings of motor vehicle 10.

In a step S4, based on the previously carried out situation analysis, an anticipatory prediction of the surroundings of motor vehicle 10 is carried out. A future movement behavior of motor vehicle 10 based on a high probability is created in this way.

A behavior generation in a step S5 enables a planning of actions which are required in order to implement the situation which was previously predicted. For example, this may include the planning of a lane change which is to be carried out or a change in velocity of motor vehicle 10 which is to be carried out.

According to the present invention it is now provided that in the automated driving operation of motor vehicle 10, so-called standard trajectories ST1 are generated in a step S6 and transmitted to a control system 40, the mathematical data of trajectories ST1 being converted with the aid of control system 40 into data which are processable by an actuator device 1. Control system 40 transmits the mentioned data to actuator device 1 of motor vehicle 10, which may include multiple actuators (steering actuators, for example.)

Essentially simultaneously or also chronologically in very short succession, a safety zone B or a safety trajectory ST2 is created in step S6, in particular cyclically, which is also transmitted to control system 40 or transmitted by it to actuator device 1. For the calculation of safety zone B or safety trajectory ST2, the detected movement of other road users must be predicted, taking physically possible and probable movement changes into consideration. Control system 40 thus transfers valid lane data not only at the present point in time but also future data of safety trajectory ST2 and safely accessible zones, which are approached in the error case. Bus systems intended for the transmission of the mentioned data may be CAN, FlexRay or Ethernet-based, for example.

An error monitoring device 30 is provided in order to monitor the processes of steps S1 through S4 mentioned above. This may mean, for example, that status messages of sensor device 2 are monitored, or that plausibility checks of sensor device 2 are carried out via different sensors (for example, video sensors, radar sensors, ultrasound sensors, etc.) As a result, this means that a probabilistic error monitoring of the system, is carried out based on probability values with the aid of error monitoring device 30, an instruction being transmitted in the case of a detected error to control system 40 with the aid of which actuator device 1 is to follow safety zone B or safety trajectory ST2.

Error monitoring device 30 thus represents a control authority, in a manner of speaking, which establishes whether motor vehicle 10 is to be guided according to standard trajectory ST1 or whether there are circumstances where it appears reasonable for the motor vehicle to be guided into safety zone B or along safety or replacement trajectory ST2.

The method according to the present invention offers several advantages:

Due to the fact that a safety zone B or a safety trajectory ST2 is previously ascertained and transmitted to actuating elements 1, in particular transmitted essentially permanently to actuating elements 1, it is possible in the error case to, essentially immediately, switch over to safety trajectory ST2 and to thereby maneuver motor vehicle 10 into a safe zone.

A useful application of the method according to the present invention exists, for example, if a sensor system is defective and may no longer be checked for plausibility. This is detected with the aid of error monitoring device 30, whereupon it communicates to control system 40 that safety zone B or safety trajectory ST2, formed from functioning sensor system data, is to be driven through, The method according to the present invention is also useful when it is no longer possible to transmit actuating element setpoint values from control system 40 to actuator device 1 due to an error case. At this point in time, due to its very tight transmission time frame (preferably less than approximately every 40 ms), actuator device 1 already has valid actuating element setpoint values transmitted during the previous cycle available concerning the safety trajectory or safety zone, to which a switchover may be carried out with the aid of error monitoring device 30.

The present invention is also particularly useful for any error cases in which a surroundings detection of motor vehicle 10 or a localization of the vehicle on the road is not unambiguously possible in the flow of traffic due to sensor defects. This may be the case, for example, when surroundings detection systems or localization systems (radar, ultrasound sensor, video camera, GPS, etc., for example) are defective. Due to error monitoring device 30 which detects the error, an activation of safe actuator element setpoint values previously transmitted to actuator device 1 is carried out also in this case. In the case that an actuation potential of redundant actuating elements of actuator device 1 is not sufficient (for example, when a steering intervention has to be carried out with the aid of brakes since the activation of the regular steering actuator, for example the steering actuator itself, is defective), preferably safety zone B is approached since in this case it is not possible to drive along the infinitesimal formed course of safety trajectory ST2.

However, in this case it would alternatively also be conceivable to mirror the limited maneuverability of motor vehicle 10 in the behavior generation of step S5 or the planning of the trajectory of step S6 in order to obtain valid safety trajectories ST2, according to which motor vehicle 10 may then be guided despite limited maneuverability. Effectively this means nothing else but that safety trajectory ST2 may still be ascertained correctly so that a safety trajectory ST2 is now also driven along even when actuator device 1 is limited in its functionality. The execution of steering movements with the aid of brake interventions on wheels of motor vehicle 10, which are controlled by an ESP system (Electronic Stability Program), should be cited as an example.

In one further error case in which the entire action chain of the previously described steps S1 through S6 is defective, error monitoring device 30 takes on a control function and safety trajectory ST2 stored in actuator device 1—since it was previously transmitted—is activated.

Advantageously a piece of information which pertains to a planned positioning of the vehicle in the future is transmitted by the transmission of safety zone B or safety trajectory ST2. In this way resolutions for error scenarios are already projected into the future by storing positioning of the motor vehicle for such scenarios.

Figure 3:
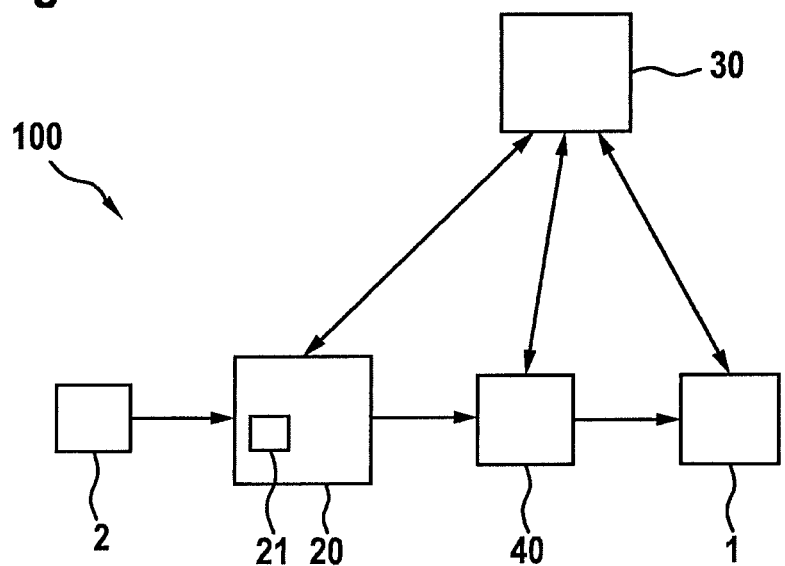
FIG. 3 shows a schematic block diagram of one specific embodiment of the device according to the present invention.

FIG. 3 shows in a schematic block diagram an overview of a specific embodiment of device 100 according to the present invention, parts of the mentioned device 100 having already been described based on the system representation of FIG. 2. It is discernible that a planning module 21, which is responsible for the planning and ascertainment of safety zone B or trajectories ST1, ST2, is provided within ascertaining device 20.

Preferably all shown components are respectively situated in individual control units. However, any arbitrary arrangement or distribution to control units of the shown components is conceivable. The double arrows shown between error detection device 30 and ascertaining device 20, control system 40 and actuator device 1 are to indicate a bidirectional communication between the mentioned components.

In summary, the present invention provides a useful possibility for guiding a motor vehicle into a safe state in a highly automated/autonomous driving operation if system-relevant defects occur. This takes place by ascertaining error scenarios in advance in the form of safety zones, safety trajectories or actuating element setpoint values and transmitting them to an actuator device. In the case that the predicted error scenario actually occurs, the already transmitted data mentioned above merely have to be activated so that the vehicle may be safely transferred into a safe state (stop, on the emergency lane, if necessary).

Advantageously, a possible system failure is preferably rapidly detected with the aid of the present invention, the driver being informed and preferably rapidly returned to the control responsibility for the vehicle. A time period between the error detection and the takeover by the driver may be bridged by the device according to the present invention.

Those skilled in the art will recognize that manifold errors of the sensor systems of the motor vehicle or critical traffic situations are controllable with the principle according to the present invention.

What is claimed is:

1. A method for operating a motor vehicle in a completely automated driving operation, comprising:
ascertaining, by an ascertaining device, a standard trajectory and transmitting the ascertained standard trajectory with the aid of a control system to an actuator device of the motor vehicle during the automated driving operation;

guiding, with the aid of the actuation device, the motor vehicle along the standard trajectory;

ascertaining, by the ascertaining device, at least one safety zone for the motor vehicle and transmitting the ascertained safety zone with the aid of the control system to the actuator device during the automated driving operation; and automatically performing a switchover to the safety zone if error-free automated driving operation for the motor vehicle is no longer ensured, whereby the motor vehicle is guided with the aid of the actuator device into the safety zone.

2. The method as recited in claim 1, wherein the safety zone and the standard trajectory are ascertained essentially simultaneously.

3. The method as recited in claim 2, wherein, with the aid of an error monitoring device, an error case of the motor vehicle is ascertained, and wherein the motor vehicle is guided into the safety zone in response to the error case.

4. The method as recited in claim 3, wherein, depending on the error case, a switchover to the safety zone is carried out with the aid of one of the control system or the error monitoring device.

5. The method as recited in claim 1, wherein in addition to the safety zone, at least one safety trajectory is ascertained and transmitted to the actuator device.

6. The method as recited in claim 5, wherein for the case in which the motor vehicle is controllable only in a limited manner with the aid of the actuator device, the motor vehicle is one of (i) guided along the safety trajectory or (ii) guided into the safety zone.

7. The method as recited in claim 5, wherein during the automated driving operation multiple safety trajectories and multiple safety zones are generated, and wherein one of the safety trajectories and the safety zones is selected after an analysis of the error case by the error monitoring device.

8. The method as recited in claim 7, wherein in the case of an error in a sensor device for a surroundings detection, the motor vehicle is guided into the safety zone.

9. The method as recited in claim 7, wherein in the case of an error in a sensor device for a surroundings detection, the motor vehicle is guided along a safety trajectory.

10. A device for operating a motor vehicle in a completely automated driving operation, comprising:
 a sensor device;
 an actuator device;
 an ascertaining device for ascertaining a standard trajectory and a safety zone;
 a control system, wherein information regarding the safety zone is transmitted to the actuator device of the motor vehicle with the aid of the control system; and
 an error monitoring device, wherein upon ascertaining with the aid of the sensor device and the error monitoring device that error-free automated driving operation for the motor vehicle is no longer ensured, the motor vehicle is automatically guided with the aid of the actuator device into the safety zone.

11. The device as recited in claim 10, wherein the ascertaining device includes a planning module for the standard trajectory, and wherein a safety trajectory is additionally ascertained with the aid of the planning module, the safety trajectory being transmitted with the aid of the control system to the actuator device.

12. The device as recited in claim 11, wherein the standard trajectory, the safety zone, and the safety trajectory are ascertained essentially simultaneously with the aid of the planning module.

13. The device as recited in claim 11, wherein the switchover from the standard trajectory to the safety zone is carried out by one of the control system or the error detection device.

14. A non-transitory, computer-readable data storage medium storing a computer program having program codes which, when executed on a computer, perform a method for operating a motor vehicle in a completely automated driving operation, the method comprising:
 ascertaining, by an ascertaining device, a standard trajectory and transmitting the ascertained standard trajectory with the aid of a control system to an actuator device of the motor vehicle during the automated driving operation;
 guiding, with the aid of the actuation device, the motor vehicle along the standard trajectory;
 ascertaining, by the ascertaining device, at least one safety zone for the motor vehicle and transmitting the ascertained safety zone with the aid of the control system to the actuator device during the automated driving operation; and
 automatically performing a switchover to the safety zone if error-free automated driving operation for the motor vehicle is no longer ensured, whereby the motor vehicle is guided with the aid of the actuator device into the safety zone.

\* \* \* \* \*